Nov. 12, 1968   H. P. GROSSIMON ET AL   3,410,956
PLANAR DIGITAL ENCODER
Filed March 23, 1964   5 Sheets-Sheet 3

INVENTORS
HERBERT P. GROSSIMON
JAMES O. McDONOUGH
GERALD T. MOORE
BY
ATTORNEYS

United States Patent Office 3,410,956
Patented Nov. 12, 1968

3,410,956
PLANAR DIGITAL ENCODER
Herbert P. Grossimon, Arlington, James O. McDonough, Concord, and Gerald T. Moore, Bedford, Mass., assignors to Concord Control, Inc., Boston, Mass., a corporation of Massachusetts
Filed Mar. 23, 1964, Ser. No. 353,793
13 Claims. (Cl. 178—19)

ABSTRACT OF THE DISCLOSURE

This invention relates to apparatus for encoding lines on a plane surface such as contour lines on a map in digital form. The apparatus includes means for providing a plane surface such as a table, a floating arm drafting machine having at least two floating arms adpted to move together. The first of the arms supports a stylus at the free end and permits the stylus to be positioned throughout a substantial portion of the table surface. The second arm positions an electro-optical transducer, spaced from the stylus, over an optical grid. The grid is formed of alternate transparent and opaque sections and is positioned parallel to the table surface and immediately adjacent to the transducer. A light source is positioned to illuminate the transducer through the grid so that as the stylus is moved over the table surface, the transducer receives electrical signals through the grid which quantifies the motion of the stylus over the plane surface. The apparatus also includes electrical circuit means responsive to the signals from the transducer for producing digital signals representative of magnitude and the direction of movement of the stylus over the plane surface. A novel phase comparator is disclosed for this use.

---

Our invention relates to a novel system for generating digital signals proportional to the magnitude and direction of changes of position in a plane of a stylus or marker with respect to a selected reference point in that plane. Our invention also relates to a system for providing digital electrical signals corresponding to the instantaneous coordinate position of a movable stylus. Our invention digitizes the information obtained from a transducing element or elements as the stylus is moved throughout the plane; accordingly our invention relates to a planar digital encoder.

Such an encoder may be used to perform a wide variety of functions. In addition to providing digital signals corresponding to the incremental change in position of a stylus, a digital encoding system may be used to provide the absolute coordinate position in digital form of any point in a plane. Further, such a system may be used to trace and record in digital form any information that can be described by lines, points, or symbols. Thus, maps, charts, or mechanical drawings may be converted into a digital data record which may be stored or processed for further use.

Previous techniques for providing electrical indications of changes in the position of a movable stylus or marker in a plane utilized a variety of electrical, mechanical, and optical methods either alone or in combination. One technique, for example, used angular digital encoders attached to the centers of rotation of the arms of a conventional floating arm drafting machine. As the stylus or reference marker attached to one of the arms of the drafting machine was moved through the plane, the digital encoders picked off the arm angles corresponding to each position of the stylus in the plane. This angular information, together with the length of each arm, was then sent to an R, Θ transformation matrix which converted the information obtained in polar coordinates to information in some other desired coordinate system as for example X, Y Cartesian coordinates. This system required rather complex conversion equipment when outputs were desired in the form of rectangular coordinates. Also, the lack of rigidity in the joints resulted in errors in the encoder measurements and therefore, errors in indicated position. Further, the digital encoders were subject to wear caused by constant motion of the arms. Our invention avoids these problems by locating an electrical transducing element at the tip of one of the arms of a floating arm drafting machine and coding the entire plane through which the stylus moves. The output of the transducing element is given directly in the coordinate system desired and no complex transformation equipment is required.

Another technique heretofore utilized included a drafting machine capable of motion in a given plane together with one or more sets of uniquely coded wires, a single set being used for each coordinate desired to be represented. The wires were coded by means of varying frequencies or varying voltage levels applied to them. As a reference marker or stylus was moved throughout the plane, a mechanical pick-off contacted each wire in turn, thus producing a unique signal for each position in the plane. This system required a multiplicity of separate signal sources to code each wire. This requirement becomes especially onerous when a small grid spacing and large area coverage is desired. Limitations on the resolution of this system imposed the further requirement that each wire or lead be isolated from all others and that each wire be of sufficient mechanical strength to withstand repeated contact with the sensing element. Further, bridging problems, that is, the mechanical contacting of two or more separate wires by the sensing element were encountered as the grid spacing was decreased.

Another prior technique for encoding in digital form the position of a stylus in a plane utilized two sets of optical transducers (for example photocells) located in a single plane, each set being perpendicular to the other within the plane, and each set being provided with a light source which passed a parallel beam over the plane. Interruption of the light incident on each photocell by a stylus moving in the plane provided an output signal from the system. Such a system is strongly sensitive to the spacing of the photocells and is of limited accuracy when the area of the coordinate system is extended. Such a system is described for example in United States Patent No. 3,016,-421 issued on Jan. 9, 1962 to Harmon.

Accordingly it is an object of our invention to provide an improved system for generating digital signals representative of the coordinate position of a movable stylus within a given reference system. In accordance with our invention, we provide an extended flat surface on which there is mounted a map, design, mechanical drawing, or other figure which it is desired to encode. A movable stylus, mounted on a floating arm structure, is used to trace the desired features of the mounted figure. An optical grid is mounted on a surface parallel to and below the surface on which the figure is mounted, the grid being composed of alternate opaque and transparent segments in directions parallel to each of the coordinate axes. The grid may comprise two plates with all the lines for the X direction, for example, on one plate and all the lines for the Y direction on another. Alternatively these two grids may be combined in a single transparent plate, the pattern appearing on this plate then being a series of transparent squares bounded on all four sides by opaque lines i.e. a "screen-wire" pattern. In the description of our invention which follows, reference will be made to an optical grid for both X and Y axes formed on a single transparent plate. It will be obvious however that our invention may equally use two separate sets of grid lines and such a structure is within the contemplation of our invention.

An electro-optical transducer (e.g. a photocell) is mounted on a second floating arm in a plane parallel to the plane of motion of the stylus arm and adjacent to the optical grid. A light source is provided to supply illumination to the photocells through the optical grid. As the stylus is moved across the figure, the transducing element is correspondingly moved across the optical grid and electrical signals are generated by the photocells within the transducer as successive translucent and opaque segments of the grid are traversed. Effectively, the grid, lightsource, and transducer form a light-modulation and detection ssytem. The signals from the transducer are fed to a data interpreter unit to provide an output signal which represents the incremental change in position and direction of the stylus with respect to the chosen reference origin. The incremental changes in position of the stylus may be supplied to signal storage and recording appartus for processing the signals for transfer to magnetic tape or other recording means. Alternatively the changes in position may be supplied directly to a computer for further processing. If desired, the output signals may also be fed to a digital counter which indicates the instantaneous position of the stylus in the form of a visual or other desired display.

Accordingly, a further object of our invention is to provide a system for the automatic measurement and recording of the position of a movable stylus with respect to a fixed point as the stylus is moved along a path or contour chosen by the operator of the stylus. A still further object of our invention is to provide a system for the detection of changes in position of a movable stylus or marker, the changes in position of the stylus being obtained in both absolute and incremental form. Yet a further object of our invention is to provide a graphic tracing and recording system capable of rapid response and high accuracy with relatively few moving mechanical parts. Another object of our invention is to provide a light-modulation and detection system for the measurement of the position of a reference marker or stylus as the marker is moved in a given plane.

Our invention accordingly comprises the features of construction, combinations of elements, and arrangements of parts which will be exemplified in the constructions hereinafter set forth and the scope of our invention will be indicated in the claims.

For a fuller understanding of the nature and objects of our invention, reference should be had to the following detailed description taken in connection with the accompanying drawings in which:

FIG. 6b is a waveform diagram useful in explaining the operation of the circuit of FIG. 6a;

FIG. 7b illustrates the output waveforms from the photocells of FIG. 6a.

Figure 1:
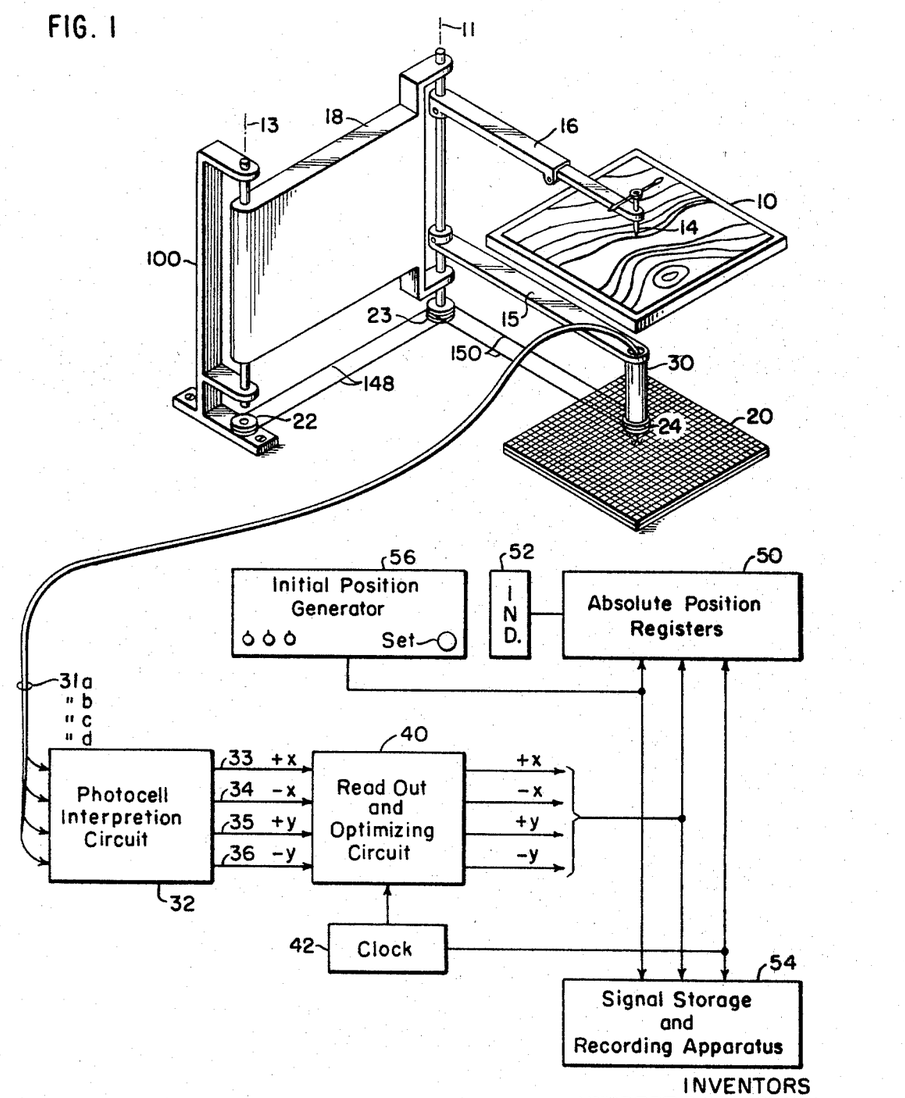
FIG. 1 is a pictorial and block and line diagram illustrating an embodiment of our invention.

In FIG. 1 one embodiment of a planar digital encoder according to our invention is shown. A map, chart, or other figure containing continuous curves ("curve" being used in its generic sense to include straight lines) to be digitized is mounted on a flat surface, such as a drawing board or the surface of a drafting table. A stylus or marking element 14 is attached to an arm 16; the arm 16 is in turn pivotally attached to an arm 18, the two arms forming a floating arm drafting machine. The arm 18 is free to rotate about the pivot point 13; thus the stylus 14 is capable of being moved in a horizontal plane over the entire surface of the table 10. Parallel to the table 10 and directly below it is an optical grid (or grating) 20. This optical grid consists of a first set of alternate translucent and opaque sectors running in a direction parallel to one axis of a given two axis coordinate system and a second set of alternate translucent and opaque sectors parallel to the second axis of the coordinate system. In FIG. 1 the coordinate system is shown as a rectangular coordinate system and the alternate translucent and opaque sectors of each set are parallel to the X and L axes of the coordinate system respectively. It should be understood that other coordinate systems may also be used if desired.

An optical transducer 30, which is attached to an arm 15, is positioned directly above the grid 20. The arm 15 is also attached to the arm 18 at the pivot point 11 and is free to rotate about that point. The arms 15 and 16 are constrained to rotate about the pivot point 11 as a single unit. This may be accomplished by constructing the arms 15 and 16 as two separate but interconnected fingers of a single mechanical member pivoted about the point 11. Thus the motion of the stylus 14 with respect to the table 10 is reproduced exactly by the motion of the transducer 30 with respect to the grid 20. A conventional double pulley system such as is used on drafting machines and which includes pulleys 22, 23 and 24 maintains the angular orientation of the transducer 30 constant with respect to the X, Y axes of the grid 20 as the head 30 is moved about the table.

The transducer head 30 contains a light source and two sets of photocells for detection of motion in the X and Y direction across the grid 20. The bottom surface of the grid 20 is silvered to reflect the light issuing from transducer 30 back onto the photocells in the transducer. Alternatively, the drafting machine may be provided with an additional arm for supporting the light source below the grid. A more detailed description of the construction of transducer 30 is given below in conjunction with the explanation of FIGS. 3a and 3b. As the transducer 30 is moved over the grid 20, the light from the light source incident on the photocells is continually interrupted by the opaque segments of the grid 20. Thus the grid 20 serves as a modulation system for the light source and photocells in the transducer 30. The electrical signal thus generated by transducer 30 is fed to the photocell interpretation circuit 32. This circuit amplifies the signals appearing on the leads 31a, 31b, 31c and 31d from transducer 30 and converts these amplified signals into a series of pulses; these pulses appear on output leads 33 through 36 respectively. The presence of a pulse on any one of these leads signifies an incremental change in position of the transducer in the corresponding direction and the number of pulses on a given lead is proportional to the total distance traversed in that direction. The exact structure of the photocell interpretation circuit 32 is dependent on the type of photocell pickup used in the transducer 30. The structure of the unit will be discussed in greater detail in connection with the various pickup heads to be described below.

As stated above, the output signal on the leads 33 to 36 is representative of the incremental changes of position of the stylus. Before utilizing this output, however, it may be desirable to convert it into a different format for storage or further processing. Thus, for example, it may be desirable to synchronize the output on these leads with a series of clock pulses which control the overall timing of the system. The readout and optimizing circuit 40 accomplishes this purpose. The circuit 40 consists of a series of flip-flops and multivibrators under control of the clock circuit 42. The clock 42 may be any one of a number of known multivibrator or other type circuits designed to provide a series of accurately spaced pulses at predetermined times and bearing a fixed relation to each other. The clock controls the operation of the read-out and optimizing circuit 40 such that the output pulses from the circuit 40 are formed in synchronization with clock pulses from the clock circuit 42. Further the circuit 40 performs an optimizing operation on the data fed into it, that is, it determines whether each information bit may be combined with a following bit of information or must be read out by itself. For example, it may be desired to read out information from the circuit 40 only when one or both of the X and Y coordinates have changed. Thus, for example, if the stylus 14 were moved from the point 0, 0 along a path to $X=1$, $Y=0$, thence along the path $X=1$ to the final point $X=1$, $Y=1$ the circuit 40 would suppress the readout until the final point $X=1$, $Y=1$ had been reached. When our system is used with a high speed tape storage, this optimization of data will conserve valuable storage space on the tape.

The output from the circuit 40 is fed to the absolute position register 50 and also to the signal storage and recording apparatus 54. Both of these circuits are also under control of the clock 42. The function of the circuit 54 is to provide temporary storage for the data from circuit 40 and also to transfer this data onto any desired recording means. This circuit may be formed from any number of well known storage and recording circuits in common use with digital storage and recording systems.

The absolute position registers 50 consist of a set of bi-directional binary coded decimal counters, one counter being utilized for each of the coordinate axes involved. The purpose of these registers is to convert the incremental X, Y information into absolute form. The counters used in these registers may be any of a number of well-known bi-directional counters. Attached to the registers 50, and activated thereby, is an indicator 52. The function of this indicator is to provide a visual display of the absolute position of the stylus 14, as the stylus is moved to any point in the plane. A manual data input generator 56 is also connected to the absolute position register 50 and the signal storage and recording apparatus 54. The function of this generator is to allow the initial position of the stylus 14 to be recorded and displayed. The generator also contains provision for setting in any desired information associated with any selected position of the stylus 14.

The system described may be operated in either the incremental or the absolute mode. In the absolute mode the initial position or reference point of the stylus is entered by the manual data input generator 56 and the stylus is moved to any desired point in the plane defined by the table 10. The coordinates of the selected point with respect to the reference point are then automatically digitized and recorded or displayed. Any information associated with the selected point that the operator desires to preserve may also be entered via the manual data input generator 56. In the incremental mode, the relevant outlines of a contour, mechanical drawing, or other desired feature are traced by the operator by means of stylus 14. This information is again digitized and recorded or displayed.

Figure 2:
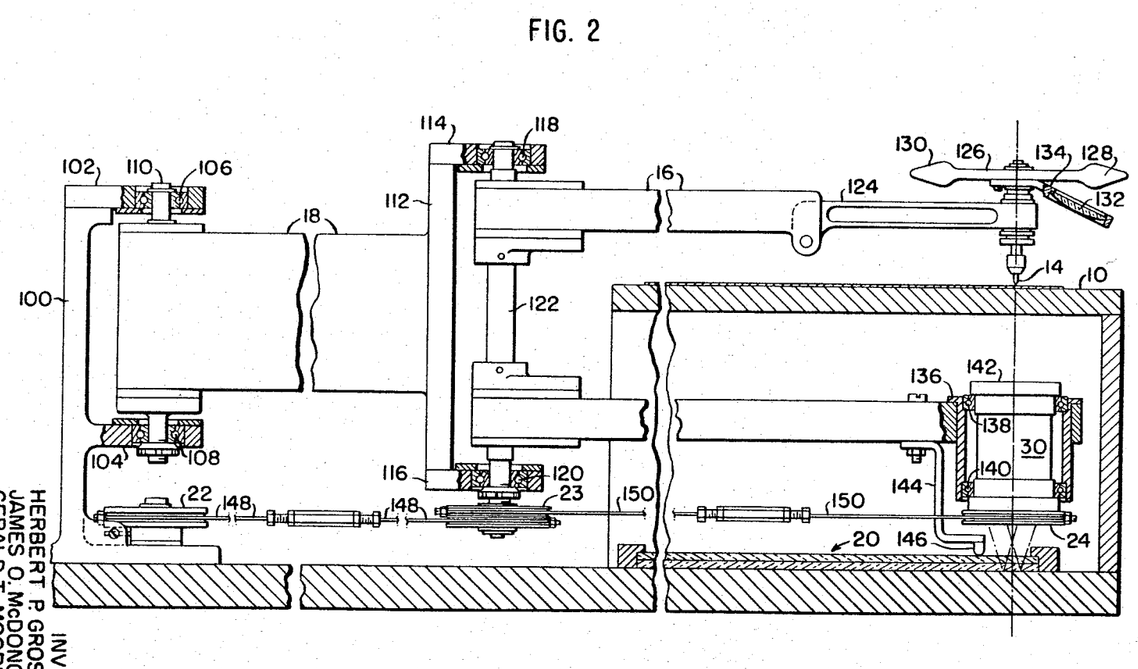
FIG. 2 is a side elevation, partially in section, of the floatinng arm showing the manner of positioning the stylus and transducer.

In FIG. 2, we have illustrated in greater detail than is shown in FIG. 1 the construction of a floating arm arrangement useful in our invention. As shown therein, the fixed pivot of the arm 18 includes an E-shaped bracket 100. The base of the bracket 100 is secured to a fixed horizontal surface. Secured in the two upper arms 102 and 104 of the bracket 100 are bearings 106 and 108 respectively. A shaft 110, which is rigidly secured to the arm 18, is journalled in these bearings with its axis in a vertical plane. The arm 18 is thus free to rotate in a horizontal plane. We have found that the arm 18 may be advantageously constructed of a honeycomb material covered by a light outer skin and it is so illustrated in FIG. 2.

The outer end of the arm 18 terminates in a yoke generally indicated at 112 which is preferably formed of a solid material such as aluminum. Each of the arms 114 and 116 of the yoke 112 carry bearings 118 and 120 to support a shaft 122 journalled therein with its axis in a vertical plane. The arm 16 which carries the stylus 14 and the arm 15 which carries the optical transducer 30 are rigidly fixed to the shaft 122 and are free to rotate with it in a horizontal plane. The arms 15 and 16 are also preferably of honeycomb material covered with light sheet metal to provide both lightness and rigidity.

As shown in FIG. 2, the arm 16 which carries the stylus extends over the top of the drawing board or table generally indicated at 10 while the arm 15 extends between the table 10 and the optical grid generally indicated at 20. It will be observed that the vertical axis of the stylus assembly 14 and the optical transducer 30 are the same.

It will also be observed that the stylus assembly 14 is mounted on a bracket 124 which is pivotally mounted for rotation about a horizontal pivot in the outer end of the arm 16 so that the stylus assembly may be rotated out of contact with the upper surface of table 10 if desired. The stylus assembly includes a bar 126 at the top portion thereof on the outer ends of which are formed the flattened portions 128 and 130 which can be readily gripped by the fingers of the operator for movement of the stylus. A lens 132, mounted in a lens mount 134, is also mounted on the stylus assembly in the manner shown to permit the operator to readily view the tip of the stylus where it engages the upper surface of the table 10.

The outer end of the arm 15 terminates in a cylindrical barrel member 136 which is rigidly attached to the arm 15. The outer races of bearings 138 and 140 are secured to the interior surface of the barrel member 136, and the inner races of these bearings mount the cylindrical housing 142 of the optical transducer 30 whereby the transducer may be rotated about a vetrical axis within the member 136. A support arm 144 having roughly a Z-shape is also secured to the arm 15 at its outer end. A Teflon button 146 is secured in the lower leg of the support arm to insure that the optical element always remains at a fixed distance from and parallel to the optical grid 20.

A non-rotatable sheave or pulley 22 is fixed to the base of the bracket 100 and a rotatable pulley 23 having a double groove therein is secured to a lower extension of the shaft 122 at the outer end of the arm 18. The pulley 23 is rotatably mounted on the shaft 122. The lower end of the housing 142 is shaped so that a sheave or pulley 24 is integral therewith. A wire 148 is fixed to the fixed sheave 22 at one side thereof, is passed around the pulley 23 in the lower of the two grooves formed therein and is returned to the fixed sheave 22. Similarly a second wire 150 is fixed to the pulley 23 at one side thereof, passes around the pulley 24 at the end of the transducer housing and is returned to the other side of the pulley 23 where it is fixed. This system, well known in conventional floating arm drafting machines, maintains the orientation of the transducer 30 with respect to the X and Y axes of the optical grid no matter where the stylus (and therefore the transducer) is located in the plane of the table.

Thus, from the foregoing, it is apparent that the stylus and the optical transducer are rigidly supported at the ends of the floating arms which are free to move over the entire plane on which is placed material to be encoded and further, that a constant orientation of the transducer with respect to the axes of the plane will be maintained regardless of the stylus position.

Figure 3A:
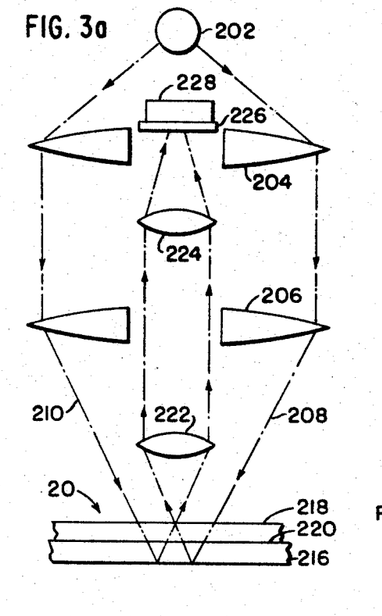
FIG. 3a is a diagrammatic illustration of the manner in which the light source and photocells may be mounted in the transducer.

FIG. 3a shows in diagrammatic form an optical system which is used in the transducer 30. As shown therein it includes a light source, such as an ordinary incandescent bulb 202, and a pair of lenses 204 and 206. These lenses are ring-shaped, the center portion being omitted for reasons to be hereinafter explained. As shown by the ray-lines 208 and 210 these lenses cause an area of the silvered surface 214 formed on the bottom of the grid plate structure to be illuminated. This light is reflected upwardly as seen in FIG. 3a through the two transparent plates 216 and 218. The grid is formed at the facing surfaces of the two plates 216 and 218, one set of opaque lines parallel to the X axis being formed on one plate e.g. plate 216 and a second set of lines parallel to the Y axis being formed on the other e.g. plate 218. The two plates are secured in facing relationship to form the grid, indicated at 220.

The light, after passing through the grid, next passes through the objective lens system formed by lenses 222 and 224 and is focused by this lens system on the photocell masking plate 226. Four photocells, shielded from all light except that falling on them from the mask, are enclosed within a housing shown at 228.

Figure 3B:
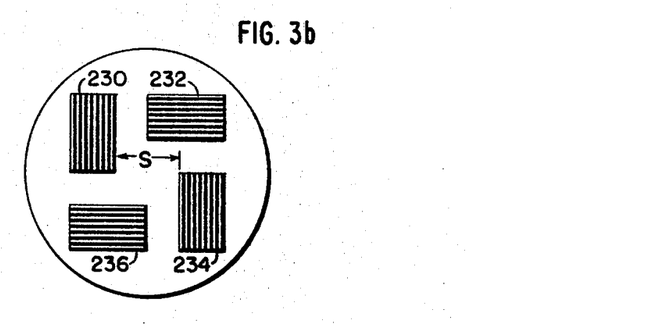
FIG. 3b is an end view showing the position of the photocells in the transducer.

FIG. 3b shows the photocell masking plate 226 in greater detail. As shown therein, the plate has four openings 230, 232, 234 and 236. A photocell is positioned behind each of the openings. The potocells behind the diagonally opposite openings 230 and 234 are for the detection of motion in the X direction and will be herein referred to as the X photocells. The photocells behind the openings 232 and 236, which are for the detection of motion in the Y direction will be referred to as the Y photocells. Each of the openings 230 and 234 is covered by a mask having alternate transparent and opaque sectors which correspond with the transparent and opaque sectors of the image of the X lines of the grating formed thereon. Thus, when the optical transducer is positioned so that the opaque lines in the mask correspond with the image of the opaque lines of the grid formed thereon by lenses 222 and 224, the maximum amount of light will strike the photocells, giving a maximum output signal. Conversely if the transducer is positioned so that the lines of the grid image fill the spaces in the mask over the photocell opening, then a minimum amount of light will be passed to the cell. Thus for movement in the X direction as the image of the grid lines alternately come into phase and then pass out of phase with the photocell lines a triangular waveform will be generated as shown for either the cell 230 or the cell 234 in FIG. 4.

Figure 4:
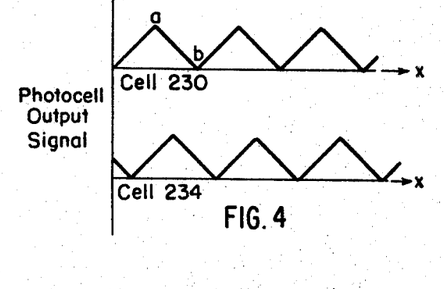
FIG. 4 shows idealized output waveforms of a pair of photocells used in the transducing element of FIG. 3.

To obtain directional information, the masks covering the photocells are so spaced that the corresponding point in the output waveform of one cell e.g. the cell behind opening 230 (hereinafter referred to as cell 230) will reach a peak one quarter unit of distance ahead (or behind) the other cell (e.g. cell 234). A "unit" is the distance from the corresponding edge of one opaque line of the grid to the next line measured at right angles to the line direction. Thus corresponding points on the masks for two cells are separated by a distance S such that $$S = nD \pm D/4$$

where D is the width of one unit in the X direction and n is any integer. For movement in the positive X direction as shown in FIG. 4, the output of cell 230 "leads" that of cell 234 by one quarter of a unit. Obviously, for movement in the negative X direction, the output of cell 234 would "lead" the output of cell 230 by one quarter unit. This same spacing for the cells to measure movement in the X direction is also provided to measure movement in the Y direction so that the cells 232 and 236 provide output waveforms similar to those shown in FIG. 4 for movement in the Y direction.

Figure 5:
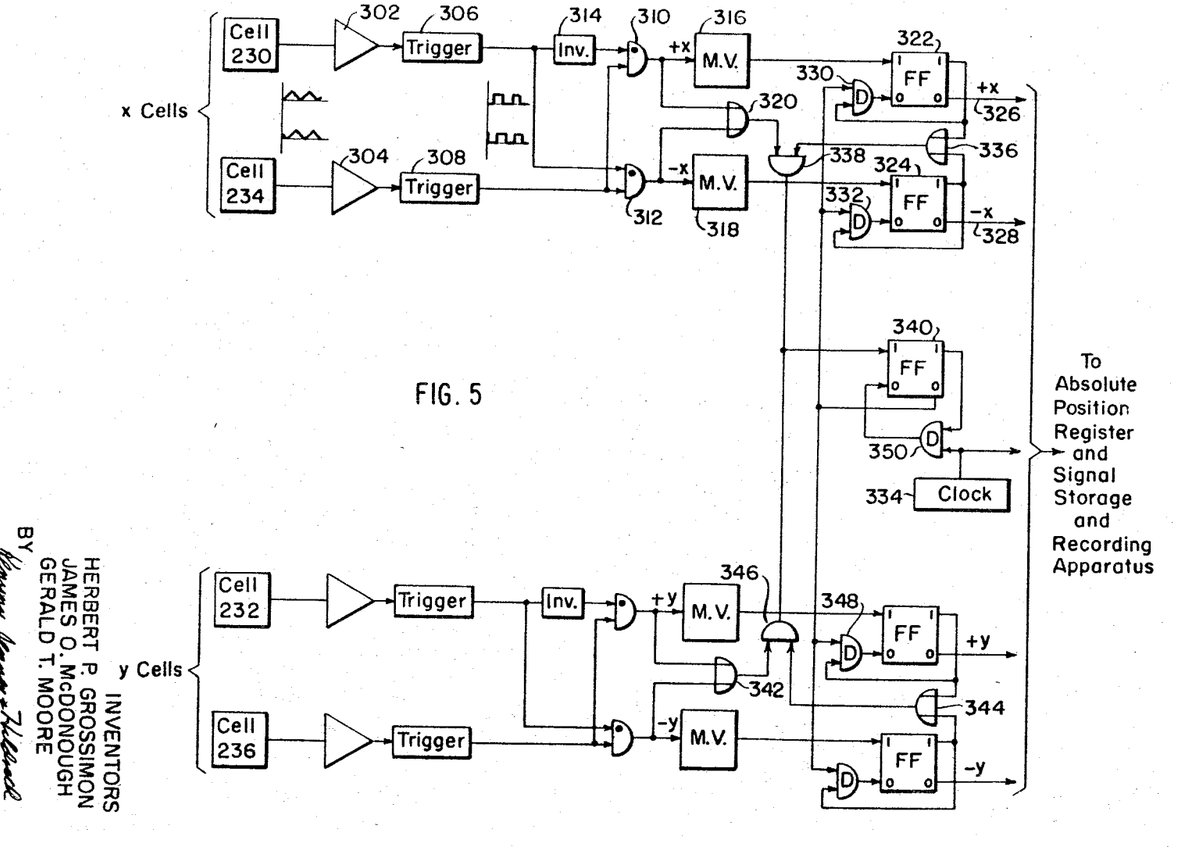
FIG. 5 is a block and line diagram of the photocell interpretation and optimizing circuitry.

In FIG 5 we have illustrated the photocell interpretation circuit and an optimizing circuit of the type heretofore described The photocell intepretation circuit for both the X and Y directions are identical Accordingly only that for the X direction will be discussed in detail The signal from each of the X cells 230 and 234 is connected as an input signal to amplifiers 302 and 304. The amplified signal is supplied to a pair of trigger circuits 306 and 308 which provide a rectangular or square wave output. The output of trigger circuit 308 is supplied to the two gate circuits 310 and 312. When the trigger circuit output is at its more positive level, gates 310 and 312 are open. When it is at its more negative level, the gates 310 and 312 are closed. The trigger circuits fire at some photocell output voltage level greater than the minimum to provide a positive output signal and "drop-out" or return to their initial state as the photocell output voltage decreases.

If, as described above, the output of cell 230 is "leading" that of cell 234 because of motion in the positive X direction, then during the time that the gates 310 and 312 are open because of a positive value of trigger 308, the transitions in the output signal from trigger 306 will be negative i.e. from a higher to a lower value. The gates 310 and 312 include a differentiating circuit to convert the transitions of the trigger circuit output waveforms to pulses; however the gates are designed to pass only positive pulses and the subsequent circuitry is responsive only to positive pulses. Thus even though the output signal from trigger 306 is connected to open gate 312, since all the transitions of the trigger output signal are negative, no signal will be passed by it.

A positive pulse will appear at the output of gate 310 for the condition specified since the output signal of trigger 306 is applied to an inverter 314 before being applied to gate 310 and the negative transitions becomes positive ones. Thus, for motion in the positive X direction a single positive pulse will appear at the output terminal of gate 310 for each line of the grid 20 crossed by the photocell.

For motion in the negative X direction the output from cell 234 will be leading that from the cell 230 and the transitions of the output of trigger 306 will all be in the positive direction during the time that gates 310 and 312 are open. These positive transitions will be inverted by inverter 314 and will thus not be passed by gate 310. However, they will be passed by gate 312. Thus, a positive pulse will appear on the output lead from gate 312 for each unit of motion in the —X direction. The Y direction photocell interpretation circuit functions in an identical manner. In effect the trigger circuits 306 and 308, inverter 314 and gates 310 and 312 function as a phase detector providing a pulse output on one or the other of two leads for each "cycle" of the input signal, the lead on which the pulse appears depending on the relative phase of the two signals. If synchronization of the pulses with a clock pulse train and their optimization were not required the pulses could be sent directly to a counter or other circuit from the outputs of gates 310 and 312.

The remaining portion of the circuit of FIG. 5 performs these two functions i.e. synchronization and optimization. Synchronization insures that the pulses representing increments of motion are synchronized with a clock pulse train; the result of optimization is that if an X pulse of either type is thereafter followed by a Y pulse of either type (or the reverse) the first occurring pulse will be stored and the two pulses will be read out together.

Thus, in the circuit of FIG. 5 the pulses from the gates 310 and 312 are each applied to an individual multivibrator. The output of gate 310 supplies multivibrator 316 and gate 312 supplies multivibrator 318. Additionally the pulses are supplied to an OR gate 320 for purposes to be hereinafter explained.

The multivibrators 316 and 318 are of the "one shot" type and when triggered produce a change in state of their output signal (here assumed to be from a higher to a lower value). The output remains in this state for a period determined by the internal circuitry of the multivibrator and then returns to its initial value. The period of the multivibrators 316 and 318 is chosen to be slightly longer than the interval between clock pulses for reasons to be hereinafter explained.

As illustrated in FIG. 5, the output signal of multivibrator 316 is connected to the "1" input of flip-flop 322 and the output of multivibrator 318 is connected to the "1" input of flip-flop 324.

The transition occurring at the end of the period of the multivibrator 316 or 318 is of the proper polarity to cause the flip-flop 322 or 324 to change state to the "1" state. An output signal representing one increment of motion in the +X or —X direction results from a change of state of flip-flops 322 or 324 from the "1" to the "0" state, the flip-flops including a differentiation circuit and diode so polarized that only pulses corresponding to these transitions appear on the output leads 326 and 328 respectively.

When either the flip-flop 322 or 324 assumes the "1" state, it supplies a voltage level to the gate 330 or 332 to cause the gate to open. A pulse of appropriately polarity thereafter applied to this gate will be passed by it to the "0" input of the flip-flop, causing it to change state and to produce an output signal. Because the change in state from "1" to "0" will cause the gate to close, there is a delay provided in the gate (indicated by a "D") so that the pulse to cause change of state will be fully passed before the gates close. Thus, an output pulse will appear when either flip-flop 322 or 324 is in the "1" state and the gates 330 or 332 are pulsed.

The X direction circuit also includes the OR gate 336 and the AND gate 338, the output of which feeds the "1" input of the flip-flop 340. Exactly similar circuitry is provided for the Y direction including an OR gate 342 corresponding to gate 320, a second OR gate 344 corresponding to gate 336 and an AND gate 346 corresponding to gate 338.

The flip-flop 340 is identical in its operation to the flip-flops 322 and 324 previously described. A delay gate 350 which functions in the same manner as gates 330 and 332 is associated with the flip-flop 340.

Clock pulses are supplied as input pulses to the gate 350 and the resetting of flip-flop 340 generates the read out pulse which is supplied to the gates 330 and 332, and to the corresponding gates in the Y direction circuit.

It is apparent from the foregoing that a clock pulse will generate a read out pulse only if flip-flop 340 has been set i.e. is in the "1" state; flip-flop 340 in turn will be set when any one of the X direction flip-flops has been set and a second X pulse, of either direction is passed through OR gate 320 and AND gate 338. Alternatively if there is a Y pulse stored in the output flip-flops and a second Y pulse appears, flip-flop 340 will be set so that the next clock pulse will generate a read out pulse. However, if an X pulse has been stored as a "1" in either of the output flip-flops 322 or 324 and immediately thereafter a Y pulse appears, it will not cause the flip-flop 340 to be set. Rather it will, after approximately one clock pulse period, be stored as a "1" in one of the Y output flip-flops. Thereafter the next pulse appearing from the photocell interpretation circuit, whether X or Y, will set flip-flop 340 and the next following clock pulse will generate a read out pulse, reading out the stored X and Y together. In this fashion a series of X pulses, or a series of Y pulses are read out one after the other. But an X pulse following by a Y (or a Y followed by an X) are read out together. This may represent a substantial saving in the amount of record required to store a given amount of information.

Figure 6A:
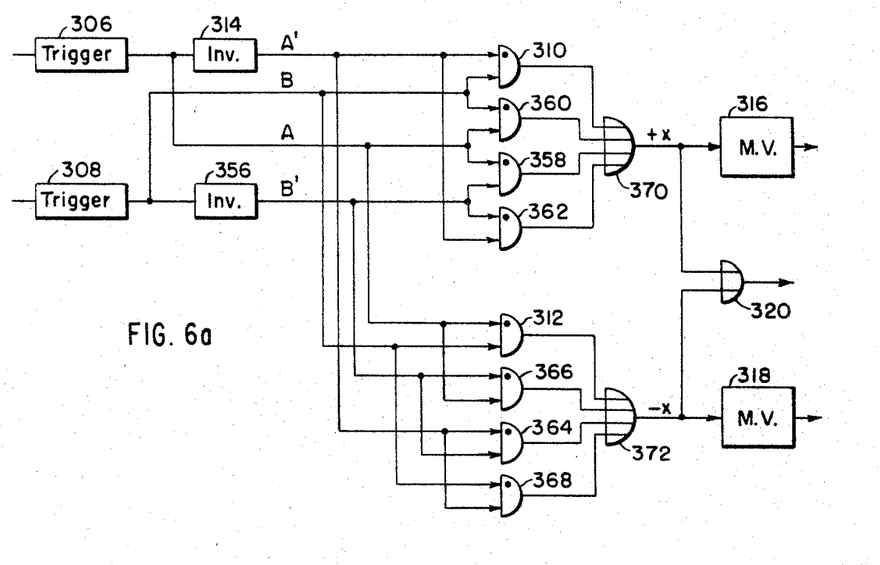
FIG. 6a is a block and line diagram of an alternative photocell interpretation circuit.

The output pulses and the clock pulses are supplied to the X and Y absolute position registers shown in FIG. 1 and to appropriate storage and recording apparatus as may be desired after being read out of the output flipflops. As described above, the photocell interpretation circuit of our invention provides one pulse for each unit of motion in the X or Y direction, the pulse appearing on one or another lead depending upon whether the motion is in the positive or negative direction. It is also possible by adding certain elements to the photocell interpretation circuit to provide two or four pulses for each unit of motion; a circuit for providing four pulses per unit of motion is illustrated in FIG. 6a. Thus, if the optical grid has a line width of $5/1000''$ and a transparent area width of $5/1000''$, a pulse will be produced by the circuit of FIG. 5 for each $10/1000''$ of motion. In the circuit of FIG. 6a, a pulse will be produced for each $2.5/1000''$ of motion. This has the effect of providing a much finer grid, without encountering the problems posed in actually ruling a grid with such fine lines. Thus the circuit of FIG. 6a substantially improves the resolution of devices made according to our invention.

In FIG. 6a the output of the trigger circuits 306 and 308 are each supplied to an inverter, the signal from trigger 306 being supplied to inverter 314 as in FIG. 5 and the signal from trigger 308 being supplied to a new inverter 356. For ease of explanation cell 230 in FIG. 5 will be designated the A cell and cell 234 the B cell. Just as in the previous discussion, the output signal from cell 230, the A cell, leads the output of cell 234, the B cell, by ¼ unit or 90° for motion in the positive direction, and lags it by 90° for motion in the other direction.

The direct and inverted waveforms from each trigger are supplied to bus wires designated A, A', B and B'. The direct waveform from the trigger associated with cell A is supplied to the bus identified as A and the inverted waveform to A'. Similarly the direct waveform from trigger 308 supplied by cell B is supplied to the bus identified as B and the inverted waveform to the bus labeled B'.

Figure 6B:
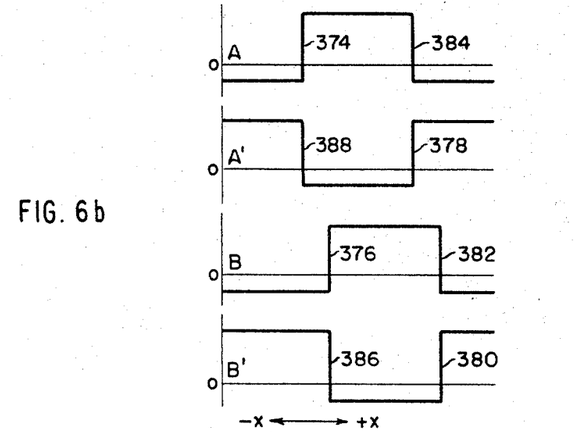

A waveform diagram showing the waveform and relative phase of these four signals is shown in FIG. 6b, each waveform being identified by the same reference as that of the bus on which it appears. Motion in the positive direction is motion to the right in FIG. 6b and motion to the left is motion in the negative X direction.

The signals appearing on the busses A, A', B and B' are connected to a series of gates which are identical to the gates 310 and 312 of FIG. 5. As discussed in connection with FIG. 5 each gate has two inputs, a "level" input and a pulse input, designed by a dot. If a positive voltage appears at the level input of a gate and a positive going transition appears at the pulse input, a positive pulse will appear on the output lead of the gate. The gates 310, 358, 360 and 362 all are connected to provide positive pulses for motion in the +X direction and their outputs are gated together by OR gate 370 and supplied to the multivibrator 316 and OR gate 320 just as in FIG. 5.

The gates 312, 364, 366 and 368 are connected to supply positive pulses for motion of the transducer in the —X direction and their outputs are gated together by OR gate 372 and supplied to multivibrator 318 and OR gate 320 just as in FIG. 5. The remaining circuit operation is identical to that of FIG. 5.

The connections for the various gates are made in the following manner. Assuming that motion starts at the left hand edge of the diagram of FIG. 6b and moves to the right, i.e. positive motion, the first positive transition which will produce a pulse is that occurring in the A waveform at 374. At this time the B' waveform has a positive value. Hence a gate should be provided with the A waveform connected to the pulse input and the B' waveform connected to the level input to provide an output pulse for this transition. The gate 358 in fact is so connected and provides the desired output pulse.

The next positive transition occurs in the B waveform at 376 and at this time the A waveform has a positive level. To provide an output pulse for this transition a gate should be provided with the B waveform connected to the pulse input and the A waveform connected to the level input. These are in fact the connections made to the gate 360. In an exactly similar fashion the transition 378 in the A' waveform and 380 in the B' waveform may be utilized to provide pulse outputs from the gates 310 and 362 respectively. The transition at 378 is the one used in the photocell interpretation of FIG. 5 to provide output pulses for motion in the positive X direction. The forgoing may be summarized in the following table:

+X Direction

| Transitions in Fig. 6b | Gate in Fig. 6a | Pulse Input | Level Input |
|---|---|---|---|
| 374 | 358 | A | B' |
| 376 | 360 | B | A |
| 378 | 310 | A' | B |
| 380 | 362 | B' | A' |

It will be observed that half of the transitions in the four waveforms, the negative ones, were not used in the +X direction. However, for movement from right to left in FIG. 6b, the —X direction, these transitions become positive transitions and are available to provide positive output pulses for motion in the —X direction. The logic of connection is the same as for the positive direction and the following table summarizes the connections to the various gates to provide positive output pulses for motion in the —X direction.

—X DIRECTION

| Transitions in Fig. 6b | Gate in Fig. 6a | Pulse Input | Level Input |
|---|---|---|---|
| 382 | 368 | B | A' |
| 384 | 312 | A | B |
| 386 | 366 | B' | A |
| 388 | 364 | A' | B' |

It will be observed that transition 384 was the one used in FIG. 5 to provide positive pulses for motion in the —X direction. Thus, utilizing the circuit of FIG. 6a, we provide four pulses per unit of motion. It will of course be obvious that two of the positive X gates and two of the negative X gates may be omitted if desired to give two pulses per unit of motion.

Further, the four output pulses may be supplied to appropriate logic to provide error correction and alarm. Thus, if a pulse appears at the output of gate 360 corresponding to transition 376, the next pulse must appear either at gate 310 for motion in the positive direction or at gate 364 for motion in the negative direction. If it does not then the circuitry has failed to produce a pulse when it should have and an alarm may be indicated. Such a condition could exist if there were dirt on the grid for example. This type of circuit may be logically implemented if it is desired.

So far our invention has been described in terms of a particular and preferred embodiment of a grid system, photocell transducer head, and photocell interpretation circuit. Various modifications however may obviously be made without departing from the scope and objects of our invention. Some of these modifications will now be described.

Figure 7A:
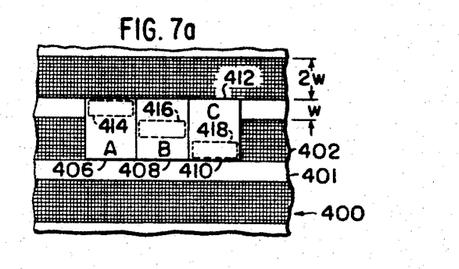
FIG. 7a is an illustration of a grid plate for coding only a single direction of motion of the stylus, the transparent and opaque sections being of unequal width.

In FIG. 7a there is shown a transducer head and grid plate configuration for the detection of motion in a single direction. For purpose of illustration the configuration will be described with reference to detection of motion in the Y direction; obviously however, a second system may be utilized in connection with the system illustrated to provide for detection of motion in both the X and Y directions. The optical grid generally indicated at 400 comprises alternate translucent sectors 401 and opaque sectors 402. For a three-photocell configuration as shown, the width of the opaque sectors is twice the width of the translucent sectors. A transducer head containing three separate photocells, shown as 406, 408 and 410 respectively, is mounted above the grid 400.

The lower side of the transducer is covered by a mask 412 which "blanks-out" all but a small segment of each photocell, thus effectively creating an "active" area on each photocell coincident with the unmasked segment thereof. The positions of these segments on the photocells are staggered such that only one such segment will be totally coincident with a translucent sector of the grid 400 at any given time. The exposed segments of the photocells are shown at 414, 416 and 418 respectively. These segments have a width $w$ which is equal to the width of the translucent sectors of the grid 400 as stated previously and is also equal to one-half the width of the opaque sectors. As the transducer is moved in the Y direction, these segments move over alternate translucent and opaque areas and alternately transmit and block light from the grid to the respective photocells.

Figure 7B:
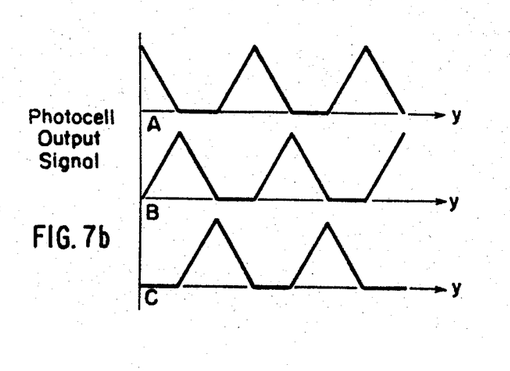

If the transducer is positioned as shown in FIG. 7a, photocell 406 will be in the illuminated or active state while photocells 408 and 410 will be in the non-illuminated or inactive state. If the transducer is now moved in the positive Y direction (upwards in FIG. 7a), the light incident on photocell 406 will be decreased, while that incident on photocell 408 will be increased; photocell 410 will remain blocked from light. As the motion in the positive Y direction continues, photocell 406 will be blocked from light, the light incident on photocell 408 will decrease, while that on photocell 410 will increase. Thus photocells 406, 408 and 410 will be illuminated and extinguished in that order. The output signal waveforms of the photocells for this sequence are shown in FIG. 7b.

For motion in the negative Y direction, it may easily be seen that the order of illumination will be given by 406, 410, 408 that is, photocell 406 will first be illuminated, followed by photocell 410 and then 408. Thus the transducer of FIG. 7a provides the necessary information for the determination of the magnitude and direction of changes in position of the transducer head, the magnitude of the change in position being proportional to the number of times the illumination is shifted from one photocell to another, while the direction of this motion is determined by the order of illumination. The output waveforms shown in FIG. 7b may be used to generate pulses in a manner similar to that described above in connection with FIGS. 4 and 5.

Although we have described the light source as being in the transducer, the light surce might be mounted below the grid 20 in FIG. 1, or the transparent segments of the grid may be illuminated in the same fashion that a grid on an oscilloscope is illuminated. Further, a single grid with two sets of transparent and opaque sectors superimposed on each other as in FIG. 1 may be utilized to detect motion in each of two perpendicular directions as described. Alternatively, two sepraate optical grids may be used, a first grid with its associated transducing head being used to detect motion in one direction and the second grid, mounted directly below the first grid and parallel to it, being used with its associated transducing head to detect motion in the second axis direction. If two separate grids are used, of course, an arm in addition to those shown will be required to carry the additional optical transducer. A separate light source would then be provided for each transducer-grid combination. Similar considerations apply to the pickup system shown in FIG. 7a.

Further, although we have described our invention with respect to X–Y coordinates in a plane, it is to be understood that other coordinate systems and other surface shapes are within the contemplation of our inventions. For example, the grid might be ruled in terms of an R–Θ coordinate system. For certain applications a set of skewed coordinates might be used. Also, the coordinates may be similar to those of the tri-axial diagrams used to indicate percentage composition in the chemical field (three sets of coordinates, each at 120° to the other).

For certain applications it may be desired to cause the stylus to traverse a cylnidrical as opposed to a flat surface for example. All of these variations are within the contemplation of our invention.

It will thus be seen that the objects set forth above, among those made apparent from the preceding description, are efficiently attained and, since certain changes may be made in the above construction without departing from the scope of our invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. A digital encoder comprising, in combination, a movable stylus, an optical energy transducing element, means connecting said stylus and said transducing element whereby said stylus and said transducing element are constrained to move simultaneously in corresponding curves over surfaces having corresponding shapes, said stylus moving over a first surface and said transducing element over a second surface, means forming an optical grating on said second surface, said optical grating having alternate translucent and opaque sectors to quantify motion in at least one direction, a light source for supplying light energy to the transducing element whereby the motion of the transducing element across the optical grating varies the intensity of the light from said light source incident thereupon, said variation in light intensity being converted by said transducing element into an electrical signal, signal transforming means for converting said electrical signal into at least two pulse trains to represent movement of said stylus in both the positive and negative sense in said direction, each pulse in said pulse train representing a predetermined unit of motion of said stylus in the direction to which said pulse train corresponds.

2. The combination defined in claim 1 in which said surfaces are planes.

3. The combination defined in claim 1 in which said two directions are orthogonal.

4. A digital encoder comprising, in combination, means providing a plane surface, a floating arm drafting machine having at least two floating arms adapted to move together, a first of said arms supporting a stylus at the free end thereof and permitting said stylus to be positioned throughout a substantial portion of said plane surface, a second of said arms positioning an electro-optical transducer spaced from said stylus, means forming an optical grid of alternate transparent and opaque sections, said optical grid being positioned substantially parallel to said plane surface and immediately adjacent said transducer, a light source positioned to illuminate said transducer through said grid, said grid quantizing the area of motion of said stylus over said plane surface in at least two different directions, and electrical circuit means responsive to the signals from said transducer for producing digital signals representative of the magnitude and direction of movement of said stylus over said plane surface.

5. A planar digital encoder comprising, in combination, a stylus, means supporting said stylus at the end of a first arm, an electro-optical transducer capable of providing varying electrical signals in response to changes in amplitude of light incident thereon, means supporting said transducer at the end of a second arm, a third arm pivotally mounted at one end thereof to a fixed support, a shaft rotatably mounted at the free end of said third arm, means securing said first and second arms in spaced relationship on said shaft, whereby said arms may rotate together about the free end of said third arm, means forming a first planar surface over which said stylus is free to move, means forming an optical grid, said grid being parallel to said first planar surface and quantizing the area of movement of said stylus in at least two directions, a light source for illuminating said electro-optical transducer through at least a portion of said grid, circuit means responsive to the electrical signals produced by said transducer as said stylus moves over the area defined by said first plane and said transducer moves over said grid to produce a plurality of individual pulse trains at least two of said pulse trains being associated with each of said directions to represent motion in the positive and negative sense in said directions, each pulse in said pulse train representing a predetermined unit of motion of the stylus in the direction to which said pulse train corresponds.

6. The combination defined in claim 5 in which said transducer is rotatably mounted at the end of said second arm and which includes means for maintaining the orientation of said transducer with respect to said grid despite the location of said transducer with respect to said grid.

7. The combination defined in claim 5 in which said means forming said first planar surface is interposed between said first and second arms.

8. A planar digital encoder comprising, in combination, a movable stylus, an optical energy transducer having at least two photocells, means connecting the stylus and transducer whereby said stylus and said transducer are constrained to move simultaneously in corresponding curves over surfaces having corresponding shapes, said stylus moving over a first surface and said transducer over a second surface, means forming an optical grating on said second surface, said grating having alternate transparent and opaque sectors, means forming a mask for said photocells and covering said photocells, said mask having alternate transparent and opaque sectors corresponding to the alternate transparent and opaque sectors of the optical grating, a light source for supplying light energy to the transducer whereby the motion of the transducer across the optical grating varies the intensity of the light from said light source incident upon said transducer, said variation in intensity being converted by said transducer into a set of varying electrical signals, signal transforming means for converting said electrical signals into a plurality of electrical pulse trains, said pulse trains including at least two pulse trains for each direction of motion of said stylus to represent movement thereof in both the positive and negative sense in said direction, each pulse in said pulse train representing a predetermined unit of motion of said stylus in the direction to which said pulse train corresponds, and comparator means connected to said signal transforming means for determining the relative phase of the pulse train sets for each direction whereby the output signals of said comparator are proportional to the magnitude and sense of motion of the stylus and transducer in a given direction.

9. A digital encoder comprising, in combination, a movable stylus, a plurality of optical energy transducing elements, means interconnecting the stylus and the transducing elements whereby said stylus and said transducing elements are constrained to move simultaneously in corresponding curves over surfaces having corresponding shapes, means forming optical gratings on the surfaces corresponding to each of the optical transducers, said gratings having alternate translucent and opaque sectors for detection of motion in a given direction, said transducers detecting motion in different directions, a plurality of light sources for supplying light energy to said transducing elements whereby the motion of said elements across the optical gratings varies the intensity of the light from said light sources incident thereon, said variation in light intensity being converted by said transducing elements into a plurality of electrical signals, each of said transducing elements providing at least one pair of signals to represent motion in both the positive and negative sense in the direction with which said transducing element is associated, signal transforming means for converting said signals into a plurality of sets of pulse trains, a single such set being produced for each transducing element in the encoder, and phase sensitive means connected to said transforming means for providing an indication of the relative phase of the pulses in each of said pulse train sets on one of two output terminals associated with each said set.

10. The combination defined in claim 9 in which the surfaces are planar and in which the means interconnecting the stylus and the transducing elements includes a first arm supporting said stylus at one end thereof, a plurality of additional arms, each of said arms supporting a single transducer at one end thereof, a support arm pivotally mounted at one end thereof to a fixed support, a shaft rotatably mounted at the free end of said support arm, means securing said first arm and each of said additional arms in spaced relationship on said shaft, whereby said arms may rotate together about the free end of said support arm.

11. The combination defined in claim 10 in which each of said transducers contains at least two active elements electrically responsive to light, said elements being covered by a mask having alternate transparent and opaque sectors corresponding to the transparent and opaque sectors of the gratings, and wherein each of said gratings is illuminated by a light source spaced on the side of the grating opposite the transducer with which said source is associated, the output signals from the active elements of a given transducer bearing a fixed phase relationship to each other for motion in a given sense in the direction to which said transducer corresponds.

12. The combination defined in claim 9 wherein each of said transducers contains at least two active elements electrically responsive to light signals, and wherein each of said gratings has a reflective surface whereby the light from the light source associated with each said grating and its corresponding transducer is reflected from said surface onto the active elements of said transducer after passing through the translucent sectors of said grating, said elements being spaced in a phased relationship whereby the output signals from a given transducer maintain a corresponding phase relationship.

13. The combination defined in claim 9 wherein each of said transducing elements provides a pair of output signals for motion in the direction corresponding to said element and wherein said signal transforming means includes a trigger circuit for converting said signals into a pair of pulse trains, and said phase sensitive means includes a plurality of phase comparators, there being at least one comparator for each transducer, each said comparator comprising, in combination, a pair of AND gates having an output terminal and a pair of input terminals, a first of said input terminals being responsive to signal levels of a given polarity and a second of said input terminals being responsive to the transitions of a given polarity in the signal applied thereto, means connecting a first pulse train signal from said trigger circuit to a first input terminal of each of said AND gates, means connecting a second pulse train signal from said trigger circuit to a second input terminal of one of said gates, and means including signal inverting means connecting said second pulse train signal to a second input terminal of the other of said gates.

References Cited

UNITED STATES PATENTS

| | | | |
|---|---|---|---|
| 3,016,421 | 1/1962 | Harmon | 178—19 |
| 3,133,266 | 5/1964 | Frishkopf | 178—20 |
| 3,297,879 | 1/1967 | Meyer | 250—237 |

THOMAS A. ROBINSON, *Primary Examiner.*